United States Patent [19]

Baldus et al.

[11] Patent Number: 5,985,430
[45] Date of Patent: Nov. 16, 1999

[54] AMORPHOUS FIBRES CONTAINING SI, B AND N, A PROCESS FOR THE PRODUCTION THEREOF AND THE USE THEREOF, AND COMPOSITES CONTAINING THESE FIBRES AND THE PRODUCTION THEREOF

[75] Inventors: Hans-Peter Baldus, Leverkusen; Gerd Passing, Köln; Aloys Eiling, Bochum, all of Germany

[73] Assignee: Bayer Aktiengesellschaft, Leverkusen, Germany

[21] Appl. No.: 08/962,795

[22] Filed: Nov. 3, 1997

[30] Foreign Application Priority Data

Nov. 11, 1996 [DE] Germany ............... 196 46 406

[51] Int. Cl.$^6$ ............... D01F 9/08; C04B 35/589
[52] U.S. Cl. ............... 428/293.1; 428/293.4; 428/366; 428/367; 428/375; 428/378; 427/255.4; 427/226; 427/399
[58] Field of Search ............... 428/366, 367, 428/368, 375, 378, 379, 380, 384, 446, 704, 293.1, 293.4; 427/255.4, 226, 399

[56] References Cited

U.S. PATENT DOCUMENTS

| | | |
|---|---|---|
| 5,094,901 | 3/1992 | Gray . |
| 5,128,286 | 7/1992 | Funayama et al. . |
| 5,354,602 | 10/1994 | Stranford et al. . |
| 5,834,388 | 11/1998 | Baldus et al. . |

FOREIGN PATENT DOCUMENTS

| | | |
|---|---|---|
| 496 137 | 7/1992 | European Pat. Off. . |
| 195 30 404 | 2/1997 | Germany . |
| 96/13472 | 5/1996 | WIPO . |
| WO 96/13472 | 5/1996 | WIPO . |

OTHER PUBLICATIONS

Advanced Structural Fiber Composites, 1995 "Intermetallic Matrix Composites", Ward–Close, pp. 281–292.
Concise Encyclopedia of Advanced Ceramic Materials, 1991, "Fiber–Reinforced Ceramics", pp. 155–160.
Mat. Res. Soc. Symp. Proc. vol. 365, 1995 Fiber Coatings and the Fracture Behavior . . . Ceramic Composite, Miller, pp. 403–410.
Mat. Res. Soc. Symp. Proc. vol. 365, 1995 Microstructures of BN/SiC Coatings on Nicalon Fibers, Dickerson, pp. 383–388.
J.Am.Ceram. Soc., 79, (1966), "Oxidation of BN–Coated SiC Fibers in Ceramic Matrix Composites", Sheldon, pp. 539–543.
J. Am. Ceram. Soc. vol. 74, 1991, "Boron Nitride Interphase . . . Composites", Naslain et al, pp. 2482–2488.
Euro–Ceramics II, vol. 2, "The Effect of Fiber Coating on Fiber . . . Composite Strength", Ostertag et al., pp. 1657–1665.
Ceramic Engineering and Science Prc., vol. 14, Coating of BN Interfaces . . . Acid and Ammonia, pp. 556–562.
Mat. Res. Soc. Symp. Proc. vol. 410, 1996, "New Polymer Precursors to SiNCB Materials", Wideman, pp. 185–190.
J. Europ. Ceram. Soc., vol. 16, 1996, "Microstructural Instabiolity . . . (HPZ) Fibres", Bodet, pp. 653–659.

(List continued on next page.)

*Primary Examiner*—Deborah Jones
*Assistant Examiner*—Jason Savage
*Attorney, Agent, or Firm*—Connolly Bove Lodge & Hutz LLP

[57] ABSTRACT

This invention relates to amorphous fibers containing Si, B and N, to a process for the production thereof and to the use thereof, and to composites containing these amorphous fibers and the production thereof.

10 Claims, 4 Drawing Sheets

OTHER PUBLICATIONS

Key Eng. Mater., vol. 89–91, 1994 "Crystallization of Amorphous Silicon . . . Microscopy (TEM)", Friess pp. 95–99.

Mat. Res. Soc. Symp., Proc. vol. 365, 1995, "Characterization of BN Rich . . . Fibers", Khasgiwale, pp. 389–394.

Advanced Structural Fibre Composites, 1995, "Si–B–(N,C)a New Ceramic . . . Applications", Baldus et al. pp. 125–132.

Mat.Res.Soc.Symp.Proc. vol. 346, 1994 "Studies on SiBN(C)–Ceramics . . . Way to Applications", Baldus et al., pp. 617–622.

Chem.–Ing.–Tech, 57, 1985, "Entwicklung von Siliciumcarbid–Verbundwerkstoffen", Fitzer et al. pp. 737–746.

Advanced Structural Fiber Composites, 1995, "Preparation of HIgh Strength Ceramic Fiber . . . Impregnation Method" Morozumi et al., pp. 403–411.

Euro–Ceramics II, vol. 2, 1995, Development of SiC–Fibre . . . Nitride, Swan et al.,pp. 1673–1677.

Baldus et al., Si–B–(N,C) A New Ceramic Material for High Performance Applications, Advances in Science and Technology, vol. 7, 1995, pp. 125–132.

Baldus et al., Studies on SiBN(C)—Ceramics: Oxidation and Crystallization Behavior Lead the Way to Applications, Mater. Res. Soc. Symp. Proc., vol. 346, 1994, pp. 617–622.

AMORPHOUS FIBRES CONTAINING SI, B AND N, A PROCESS FOR THE PRODUCTION THEREOF AND THE USE THEREOF, AND COMPOSITES CONTAINING THESE FIBRES AND THE PRODUCTION THEREOF

This invention relates to amorphous fibres containing Si, B and N, to a process for the production thereof and to the use thereof, and to composites containing these amorphous fibres and the production thereof.

The fibre-reinforcement of materials causes changes in their mechanical properties and opens up new possibilities for their use. In metals, for example, the strength is retained at high temperatures due to the incorporation of ceramic fibres (Advanced Structural Fiber Composites, Techna Srl, 1995, pages 281–292). In ceramic materials, for example, fibres result in an increase in fracture toughness and in the energy at break (Concise Encyclopedia of Advanced Ceramic Materials, Pergamon Press, 1991, pages 155–160). The fibre coating, which results in crack deflection in the composite due to its altered strength compared with the fibre and the matrix, plays an important part in fibre-reinforced materials (composites). The chemical composition, the morphological form and the thickness of the coating have an effect on the properties. In composites comprising a ceramic matrix and inorganic fibres, these fibres are preferably used in a form in which they are coated with pyrolytic carbon in the form of graphite which has crystallised hexagonally, or with crystalline, hexagonal boron nitride, since this layer has the requisite low strength for crack deflection compared with that of the matrix and fibre (Mat. Res. Soc. Symp. Proc., Vol. 365, 1995, pages 403–410; and Mat. Res. Soc. Symp. Proc., Vol. 365, 1995, pages 383–388). In air, however, the use of fibre-reinforced composites with a carbon-containing coating results in the oxidation of the fibre coatings at high temperatures (>600 C). This effect results in the embrittlement of the materials (composites) and thus to the premature failure thereof.

If the fibres are coated with a layer of hexagonal BN, the coating is likewise susceptible to oxidation at temperatures >900 C and with unimpeded access of air. However, these coatings are more stable towards oxidation than are those of carbon, and moreover, when SiC or $Si_3N_4$ are present in the composite and the availability of oxygen is reduced, they are not attacked provided that SiC or $Si_3N_4$ is still available for oxidation (J. Am. Ceram. Soc., Vol. 79, 1996, No. 2, pages 539–543).

The deposition of a coating containing hexagonal BN or C on the fibres is expensive, however. Examples of such deposition processes include the industrially expensive CVD (chemical vapour deposition) process (J. Am. Ceram. Soc., Vol. 74, 1991, No. 10, pages 2482–2488; and Euro-Ceramics II, Vol. 2, Structural Ceramics and Composites, 1995, pages 1657–1665), or the coating of fibres in a solution comprising compounds containing B, which have to be converted into hexagonal crystalline BN in a separate process step at high temperatures (Ceramic Engineering and Science Proc., Vol. 14, Part 7/8, pages 556–562).

Wo 96/13472 describes a CVD coating which has the composition B(Si)N and increased resistance to oxidation and hydrolysis. The coating is X-amorphous.

Mat. Res. Soc. Symp. Proc. Vol. 410, 1996, pages 185–190 describes ceramic materials produced from polymeric precursors and based on SiN(C)B. It was not possible to detect any crystalline BN by means of X-ray photographic examinations.

SiC, $S_3N_4$, SiCN, SiCO or SiNCO fibres are suitable fibres for coating. With these fibres, however, the coating of hexagonal BN has to be deposited in a costly separate step. Another disadvantage of these coated fibres is that composites produced with them do not exhibit long-term stability at high temperatures, e.g. because crystallisation occurs in amorphous fibres or grain growth occurs in crystalline fibres, which result, amongst other effects, in a loss of strength (J. Europ. Ceram. Soc., Vol. 16, 1996, pages 653–659; and Key Eng. Mater., Vol. 89–91, 1994, pages 95–99).

It is known that aluminium borosilicate fibres can be coated with a crystalline BN layer by a targeted heat treatment in $NH_3$. In this procedure the fibre provides the boron for producing the BN, so that an external source of B is not necessary. However, the BN layer which is produced in situ is not protected from oxidation, e.g. by atmospheric oxygen. A further disadvantage of this production process is that aluminium borosilicate fibres crystallise out (Mat. Res. Soc. Symp. Proc., Vol. 365, 195, pages 389–394). As is known, (partially) crystalline fibres have poor mechanical properties at high temperatures due to grain boundary sliding.

Fibres are known from DE-P 19 530 404 which contain Si, B, N, C and O in the form of compounds. These are hereinafter referred to in abbreviated form as SiBNC, without taking into consideration their stoichiometry and the oxygen which constitutes an impurity, and are superior to those known hitherto as regards thermal stability. However, they are not suitable for incorporation in ceramic materials in this form.

A known property of SiBNC powder particles is that thermal oxidation results in the formation of an amorphous layer which contains B and N and which also contains small proportions of silicon and oxygen, and in the formation of an overlying $SiO_2$ layer (see FIG. 1, Advances in Science and Technology, Vol. 7, 1995, pages 125–132; and Mat. Res. Soc. Symp. Proc., Vol. 346, 1994, pages 617–622). This double layer is stable in air up to 1600 C. The lower layer which contains B and N exhibits good bonding, both to the SiBNC and to the $SiO_2$.

Amorphous layers, however, are not suitable for use as a fibre coating, since, as is known, it is only coatings which have a layer-like crystal structure (hexagonal BN, graphite) which have a lower strength than that of the matrix and fibre and which thus result in ceramic fibre-reinforced materials which have high fracture toughnesses.

There was therefore a need for fibres which remain amorphous at temperatures up to 1600 C, which have an oxidation-resistant coating containing hexagonal BN, and which can be incorporated in inorganic materials. At the same time, it should be possible to deposit the layer without a costly production process. Moreover, composites which contain an inorganic material and coated fibres should exhibit crack-deflecting properties.

The object of the present invention was therefore to provide coated fibres which possess this property profile.

SUMMARY OF THE INVENTION

It has surprisingly been found that amorphous fibres containing Si, B and N, which are composed of a core, more than 80% by volume of which consists of a three-dimensional glassy network, which contains Si—N bonds as well as B—N bonds, and which optionally also contains Si—O, Si—C, B—C, C—C, C—N and/or B—O bonds, which is hereinafter abbreviated to SiBNC (irrespective of the stoichiometry, and without taking into consideration the oxygen which is only contained as an impurity), and of at least one overlying coating which contains BN crystals having a hexagonal structure as well as Si having at least one bond to oxygen, boron, nitrogen and/or carbon, fulfil these requirements, and moreover that these fibres, when embedded in a matrix, impart outstanding crack-deflecting properties thereto.

DESCRIPTION OF THE PREFERRED EMBODIMENTS

Figure 1:
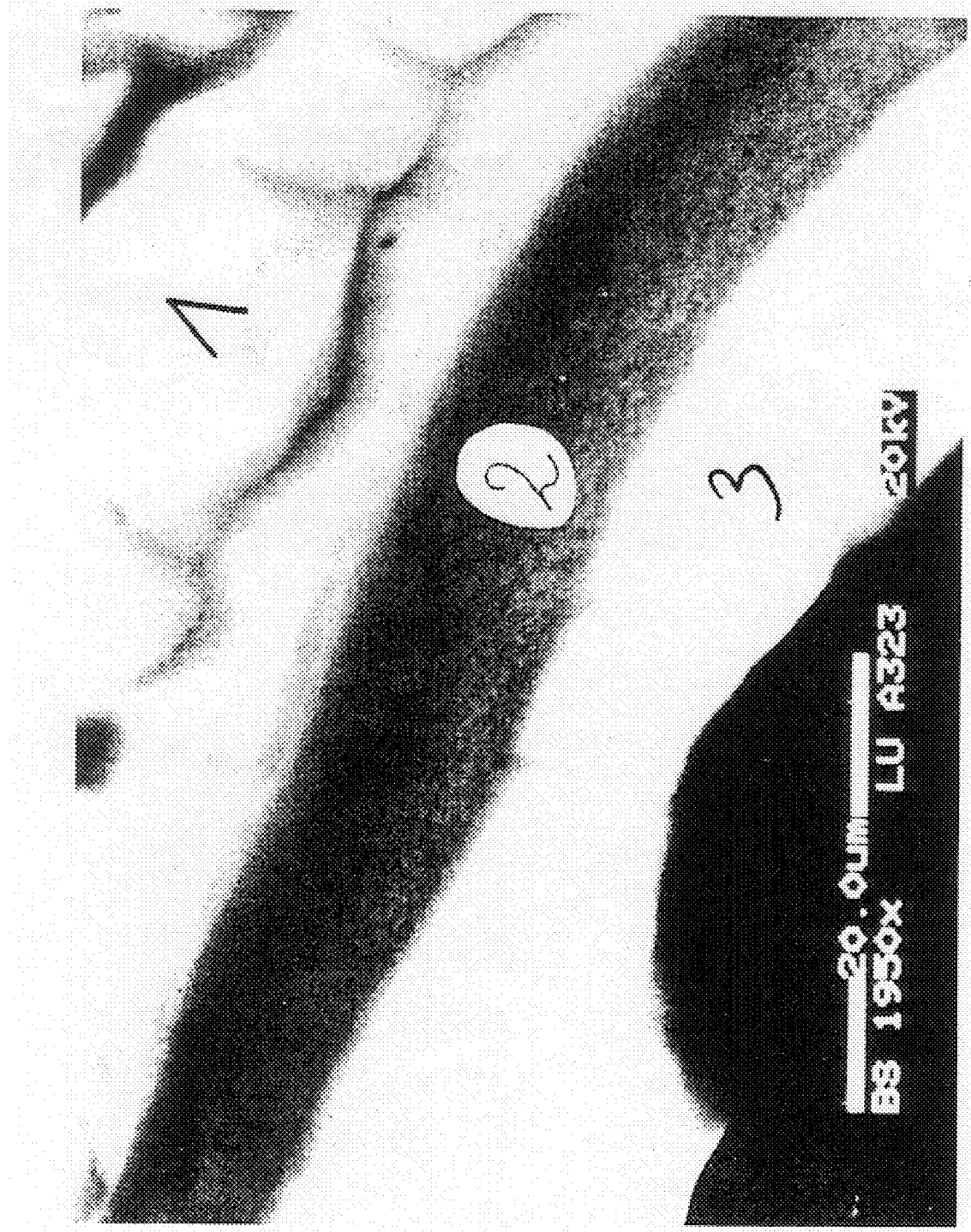
FIG. 1 shows scanning electron microscopy of the material prepared in the Reference Example.

The present invention therefore relates to amorphous fibres containing Si, B and N, which are composed of a core, more than 80% by volume of which consists of a three-dimensional glassy network which contains Si—N bonds as well as B—N bonds, and which optionally also contains Si—O, Si—C, B—C, C—C, C—N and/or B—O bonds, and of at least one overlying coating which contains BN crystals having a hexagonal structure as well as Si having at least one bond to oxygen, boron, nitrogen and/or carbon. These BN crystals are present in at least 1% by volume, preferably 5% by volume $\leq x \leq 100\%$ by volume, in the coating.

The hexagonal structure of the BN crystals may also comprise defects. In this situation it is referred to as turbostratic BN.

The layer thickness of the coating which contains BN crystals is preferably 0.5 nm to 10 μm.

The BN crystals preferably have an average crystallite size of 1 nm to 2 μm, most preferably 5 nm to 500 nm.

The amorphous fibres which contain Si, B and N are preferably fibres such as those which are described in DE-P 19530404.7. The disclosure of DE P 19530404.7, which corresponds to U.S. Ser. No. 08/907,258, is hereby incorporated by reference. Fibres which contain at least 0.5% by weight B and 0.65% by weight N are also preferred. The oxygen content of the fibres should not exceed 10% by weight. Fibres which are particularly preferred are those with B contents of $4 \leq X \leq 20\%$ by weight, N contents of $5 \leq X \leq 50\%$ by weight, Si contents of $10 \leq X \leq 50\%$ by weight, C contents of $0 \leq X \leq 35\%$ by weight, most preferably $3 \leq X \leq 32\%$ by weight, and O contents of $0 \leq X \leq 8\%$ by weight, most preferably $0.01 \leq X \leq 5\%$ by weight.

In one embodiment of the invention, the coating which contains BN crystals as well as Si having at least one bond to oxygen, boron, nitrogen and/or carbon also additionally contains proportions of amorphous BN. The constituents which are present in addition to crystalline BN may be present in a coating in addition to the crystalline BN, or even separately therefrom as an independent, overlying coating. Si having at least one bond to oxygen, boron, nitrogen and/or carbon as well as amorphous BN, are preferably contained in proportions of 1% by volume $\leq x \leq 95\%$ by volume in the coating which contains BN crystals.

In one particularly preferred embodiment, yet another overlying layer, which predominantly consists of $SiO_2$, is present above the coating which contains BN crystals. Other constituents of this layer which contains $SiO_2$ may comprise compounds of the elements C, N, B and/or O. The layer thickness of the layer which contains $SiO_2$ is preferably between 0.5 nm and 20 μm. The $SiO_2$ is preferably amorphous here. One definite advantage of this double fibre coating is that this coating, which contains hexagonal BN particles as well as Si having at least one bond to oxygen, boron, nitrogen and/or carbon, does not disappear during oxidation but remains in existence until complete oxidation of the amorphous fibres containing Si, B and N has occurred, or is constantly re-formed when subjected to an oxidising action.

The amorphous fibres containing Si, B and N according to the invention are characterised by a high resistance to oxidation.

Scanning electron microscope (SEM) investigations on the amorphous fibres according to the invention, which also possess an overlying coating containing $SiO_2$, have shown that a crack which propagates into the layer containing $SiO_2$ is deflected at the transition to the underlying coating which contains BN crystals as well as Si having at least one bond to oxygen, boron, nitrogen and/or carbon, and continues its propagation parallel to the fibre surface. This crack-deflecting behaviour predestines the fibre for use in fibre-reinforced inorganic composites. It has also been possible to determine, by means of transmission electron microscope (TEM) investigations, that the bonding of the coating which contains BN crystals as well as Si having at least one bond to oxygen, boron, nitrogen and/or carbon to the fibre core which contains Si, B, N, C and O takes place over a continuous transition. The crystalline BN particles consist of turbostratic and hexagonal BN. The amorphous fibre which contains Si, B, N, C and O remains amorphous, as does the layer which contains $SiO_2$. The bonding of the coating which contains BN crystals as well as Si having at least one bond to oxygen, boron, nitrogen and/or carbon to the layer which contains $SiO_2$ also takes place via a continuous transition.

The present invention also relates to a process for producing the amorphous fibres containing Si, B and N according to the invention, in which amorphous fibres containing Si, B and N, which consist of more than 80% by volume of a three-dimensional glassy network which contains Si—N bonds as well as B—N bonds, and which optionally also contains Si—O, Si—C, B—C, C—C, C—N and/or B—O bonds, are thermally oxidised.

The fibres described in DE-P 19 530 404.7 are preferably used as the amorphous fibres containing Si, B and N which are oxidised. These are preferably produced by the process described there, starting from polyborosilazane (PBS) green fibres. In this process, the PBS green fibres are treated with reactive crosslinking reagents before their pyrolytic conversion into amorphous fibres (SiBNC). $NH_3$, primary amines, hydrazine, silanes containing at least one Si—H bond, and/or boranes containing at least one B—H bond, are preferably used as reactive crosslinking reagents. The green fibres are rendered infusible by this treatment. The pyrolysis is likewise preferably carried out by the process described in DE-P 19530404.7. Temperatures between 1200 and 1800 C are preferred as the pyrolysis temperature.

Thermal oxidation of the amorphous fibres containing Si, B and N is preferably effected at temperatures of $800 \leq T \leq 1700$ C over a period of 0.1 minute $\leq t \leq 100$ hours. Temperatures of $1000 \ C \leq T \leq 1600$ C are particularly suitable. The heating and cooling rates can be selected within the range between 0.5 C/min and 150 C/sec; rates of $5 \leq x \leq 125$ C/sec are preferred. The holding period of the oxidation treatment (excluding the heating and cooling phases) preferably falls within a period of 1 minute $\leq t \leq 24$ hours.

The oxygen which is employed in the gases used for thermal oxidation of the amorphous fibres at high temperatures is present as free oxygen or in bound form. The preferred oxidising gases are air, oxygen, $CO_2$, gaseous $H_2O$ and/or nitrogen oxides. These gases can be diluted with inert gases in order to adjust the partial pressures of the oxidising gases. Examples of suitable inert gases include $N_2$, CO and the noble gases or mixtures thereof. The purity of the gases used should be higher than 95% by volume, preferably higher than 99.9% by volume.

Therefore, the process according to the invention is preferably carried out over a period of 0.1 minutes $\leq t \leq 100$ hours at temperatures of 800C $\leq T \leq 1700$ C, at a pressure of 1 mbar $\leq p \leq 5$ bar, in air, oxygen, $CO_2$, gaseous $H_2O$ and/or nitrogen oxides.

Another option for adjusting the partial pressures of the oxidising gases is the use of overpressure or reduced pressure. Thermodynamic calculations using the Equitherm program have shown that $SiO_2$ and $N_2$ are primarily formed as the reaction products, and when there is an excess of oxygen $B_2O_3$ and CO are formed in. addition. Both $SiO_2$ and $B_2O_3$ volatilise at high temperatures in the form of volatile: secondary products, e.g. as SiO, $B_2O_3$ or BO. The thermal oxidation of the amorphous fibres is preferably conducted at pressures between 1 mbar and 5 bar. A range from 10 mbar to 2 bar is preferred.

Volatilisation effects on oxide reaction products can be assisted by high gas velocities in the oxidation furnace. The partial pressure of gaseous reaction products and secondary products in the furnace atmosphere is kept low by the continuous or repeated replacement of the furnace atmosphere. The furnace atmosphere is typically replaced between 5 times and 60,000 times during the oxidation period.

Oxidation of the amorphous fibres containing Si, B and N, which consist of more than 80% by volume of a three-dimensional glassy network, which contain Si—N bonds as well as B—N bonds, and which optionally also contains Si—O, Si—C, B—C, C—C and/or B—O bonds, may preferably be conducted in an oxidising flame.

The amorphous fibres containing Si, B and N, which consist of more than 80% by volume of a three-dimensional glassy network, which contain Si—N bonds as well as B—N bonds, and which optionally also contains Si—O, Si—C, B—C, C—C, and/or B—O bonds, may be present in loose form, or in woven, wound or compacted form.

In one preferred embodiment of the invention, the amorphous fibres containing Si, B and N according to the invention are subjected, after thermal oxidation, to a thermal after-treatment in a non-oxidising atmosphere. The gases which are used for the thermal after-treatment of the amorphous fibres which are provided with a coating containing BN crystals as well as Si having at least one bond to oxygen, boron, nitrogen and/or carbon may be inert or reducing. $N_2$, CO and/or noble gases are preferred. The gases are preferably of sufficient purity so that they do not cause further oxidation of the coating which is produced containing BN crystals as well as Si having at least one bond to oxygen, boron, nitrogen and/or carbon, and of the amorphous fibres. Examples of harmful impurities include $O_2$, $CO_2$ and $H_2O$. The impurities preferably do not exceed 1% by volume, most preferably 0.1% by volume.

Thermal after-treatment is preferably conducted at pressures $\leq 5$ bar. A pressure range from $10^{-5}$ to 2 bar is particularly preferred.

One possible after-treatment of the amorphous fibres according to the invention is preferably carried out over a period of 5 minutes $\leq t \leq 140$ hours at $800 \leq T \leq 1900°$ C., at pressures between $10^{-5}$ and 2 bar in a non-oxidising atmosphere. Temperatures of $1000°$ C. $\leq T \leq 1700°$ C. are particularly suitable. The heating and cooling rates can be selected within the range of $5 > x \leq 125°$ C./sec. The duration of the after-treatment preferably falls within a period of 10 minutes $\leq T \leq 50$ hours.

During the thermal after-treatment of the fibres according to the invention, oxide reaction products, e.g. $SiO_2$ or $B_2O_3$, can be removed from the fibre coating by volatilisation. This process is assisted by low partial pressures of the volatilising secondary products (e.g. SiO, $B_2O_2$ or BO) in the surrounding gas. The effect can be further increased by high gas velocities in the after-treatment furnace. The partial pressure of gaseous secondary products in the furnace atmosphere is kept low by the continuous or repeated replacement of the furnace atmosphere. For this purpose, the furnace atmosphere is preferably replaced between 5 times and 60,000 times during the period of after-treatment.

The amorphous fibres containing Si, B and N which are to be subjected to thermal after-treatment may be present in loose form, or in woven, wound or compacted form.

The advantages of a coating produced in this manner are a) no external source of boron is required, b) no external source of nitrogen is required, c) the coating can be produced in air, so that no expensive reaction gases and industrially expensive protective gas furnaces have to be used, d) good chemical bonding is obtained due to the continuous transition between the coating which contains BN crystals as well as Si having at least one bond to oxygen, boron, nitrogen and/or carbon and the fibre core, e) the layer containing $SiO_2$ which is optionally present can serve as an additional interface layer between the fibre core and the matrix, and in addition can serve as a further diffusion barrier for oxygen, in order to protect the coating which contains BN crystals as well as Si having at least one bond to oxygen, boron, nitrogen and/or carbon, as well as the amorphous fibres containing Si, B and N from oxidation, and f) the amorphous fibres containing Si, B and N do not crystallise out during this treatment.

In one embodiment of the invention, the layer which contains $SiO_2$ is removed in a subsequent process step. This is effected, for example, by etching with HF gas or in aqueous solution using hydrofluoric acid. In this form it is only the coating which contains BN crystals as well as Si having at least one bond to oxygen, boron, nitrogen and/or carbon which acts as the fibre/matrix interface.

It is also possible to remove the layer which contains $SiO_2$ by volatilisation during the thermal after-treatment.

The present invention further relates to the use of the amorphous fibres containing Si, B and N according to the invention as a fibre reinforcement in inorganic materials.

The matrix materials may consist of metals, alloys, glasses or ceramics or mixtures thereof, for example. The glasses are composed of oxides, nitrides or carbides or mixtures thereof and the ceramics are composed of oxides, nitrides, carbides, borides or silicides or mixtures thereof. The fibres may be employed as long or short fibres.

The present invention also relates to composites having a matrix comprising metals, alloys or glasses and containing at least one amorphous fibre containing Si, B and N according to the invention. 30 to 70% by volume of the composites preferably consist of the amorphous fibres containing Si, B and N according to the invention. The known production processes for fibre-reinforced composites can also be used for the production of the composites according to the invention, such as those described in Advanced Structural Fiber Composites, Techna Srl, 1995, pages 281–292, Concise Encyclopedia of Advanced Ceramic Materials, Pergamon Press, 1991, pages 155–160, Chem.-Ing. Tech., Vol. 57, 1985, No. 9, pages 737–746, Advanced Structural Fiber Composites, Techna Srl, 1995, pages 403–411, and Euro-Ceramics II, Vol. 2, Structural Ceramics and Composites, 1995, pages 1673–1677. Moreover, the conditions selected for the thermal after-treatment of the amorphous fibres containing Si, B and N can also be employed as part of the production conditions for composites.

The composites according to the invention can also be produced by a process in which at least one amorphous fibre containing Si, B and N, which consists of more than 80% by volume of a three-dimensional glassy network which contains Si—N bonds as well as B—N bonds, and which optionally also contains Si—O, Si—C, B—C, C—C, C—N and/or B—O bonds, is embedded in metals, alloys, glasses and/or ceramics and is thermally oxidised together with these over a period of 0.1 minutes $\leq t \leq$ 100 hours at temperatures of 800 C$\leq T \leq$1700 C, at a pressure of 0.1 mbar$\leq p \leq$5 bar in air, oxygen, $CO_2$, gaseous $H_2O$ or nitrogen oxides. The metals, alloys, glasses and/or ceramics are preferably used in the form of powders. The powder used preferably has an average particle size$\leq$50 $\mu$m. A prerequisite for this is that the matrix is completely or partly produced in oxidising gases. The conditions for this thermal oxidation are identical to the conditions for the thermal oxidation of the fibres according to the invention. Sintering may even occur during the thermal oxidation for the production of the composite. In another embodiment of the invention, however, a separate sintering step is carried out after the actual thermal oxidation. Sintering can be effected as what is termed pressureless sintering at gas pressures up to a maximum of 5 bar, as gas pressure sintering using gas pressures within the range from 5 to 200 bar, as hot isostatic pressing (as the sintering HIP process or as the capsule HIP process), or as hot pressing. Thermal after-treatment may optionally be carried out subsequent to or even during the production of the composites. In this situation, the same conditions may be selected as for the thermal after-treatment of the fibres according to the invention.

The following examples serve to explain the invention, without having a limiting effect thereon.

EXAMPLES OF EMBODIMENTS

Reference Example

SiBNC powder containing about 2% by weight $O_2$, which had been produced from uncured polyborosilazane by pyrolysis, was oxidised in air at 1600 C for 48 hours. TEM electron beam diffraction investigations on this powder verified that the layer containing B and N which was formed on oxidation and the SiBNC bulk material had remained amorphous. The outer $SiO_2$ layer was crystalline.

The photograph taken using high resolution (Hi-Rem mode) scanning electron microscopy (FIG. 1, magnification 2700:1) shows the layer structure, comprising 1: the remaining SiBNC powder; layer 2: the amorphous layer containing B and N; and layer 3: the crystalline $SiO_2$ layer.

Production of the initial fibres a) Polymer production 1000 ml methylamine were condensed at −78 C in an evacuated 5000 ml three-necked flask fitted with a 5000 ml dropping funnel, but without a pressure equalisation tube. A solution of 300 g $Cl_3Si$—NH—$BCl_2$ in 2500 ml petroleum ether was then added with vigorous stirring, so that the internal temperature did not rise above 0 C. The solid, which substantially consisted of methylamine hydrochloride, was filtered off through an inverted frit. The solvent was removed from the clear petroleum ether solution by distillation under reduced pressure. A colourless viscous oil (250 g) remained behind. The oil was subsequently thermally crosslinked for 10 minutes at 240 C to form a solid polyborosilazane. The polymer had a melting point of 200 C. Composition in % by weight —Si: 18.0; B: 7.5; N: 37.4; H: 8.1; C: 28.1, O: 0.4.

b) Production of green fibres

1. Fibres were spun from the polymers produced in a). During the spinning operation, the viscosity of the polymer was about 2 Pas. 100 filaments were spun simultaneously. During the spinning operation, hot nitrogen was blown against the fibre in the drying tower to effect further crosslinking. Whilst the polymer was being spun, the spinneret temperature was 180 C and the spinning pressure was 2 MPa. At a pulling rate of 200 m/min the fibres had a diameter of about 20 $\mu$m as non-pyrolysed fibres (gel fibres). When the parameters were held constant during spinning, no variation in fibre diameter was observed. The fibres still melted at about 210 C, which implied that they were not yet sufficiently crosslinked.

2. Fibres were spun from the polymers produced in a). During the spinning operation, the viscosity of the polymer was about 2 Pas. 100 filaments were spun simultaneously. During the spinning operation, hot $NH_3$ was blown against the fibre in the drying tower to effect further crosslinking.

A spinneret temperature of 190 C and a spinning pressure of 2.5 MPa were selected for spinning the polymer. At a pulling rate of 200 m/min the fibres had a diameter of about 18 $\mu$m as non-pyrolysed fibres (gel fibres). The fibres were infusible.

Pyrolysis was conducted at 1500 C in an $N_2$ atmosphere.

c) Curing the green fibres 1. 300 g of the green fibres produced as in b) were introduced, on the roll, into a reactor under inert conditions. 5 g of dichlorosilane was also introduced into the reactor, which was then heated to 40 C so that the dichlorosilane could evaporate. After about 2 hours, the fibres were removed from the reactor. The fibres were infusible. Thereafter, the fibres were pyrolysed in a nitrogen atmosphere at 1500 C.

2. 300 g of the green fibres produced as in b) were introduced, on the roll, into a reactor under inert conditions. 5 g of borane-dimethylamine complex was also introduced into the reactor, which was then heated to 120 C. After about 2 hours, the fibres were removed from the reactor. The fibres were infusible. Thereafter, the fibres were pyrolysed in a nitrogen atmosphere at 1500 C.

Example 1

Figure 2:
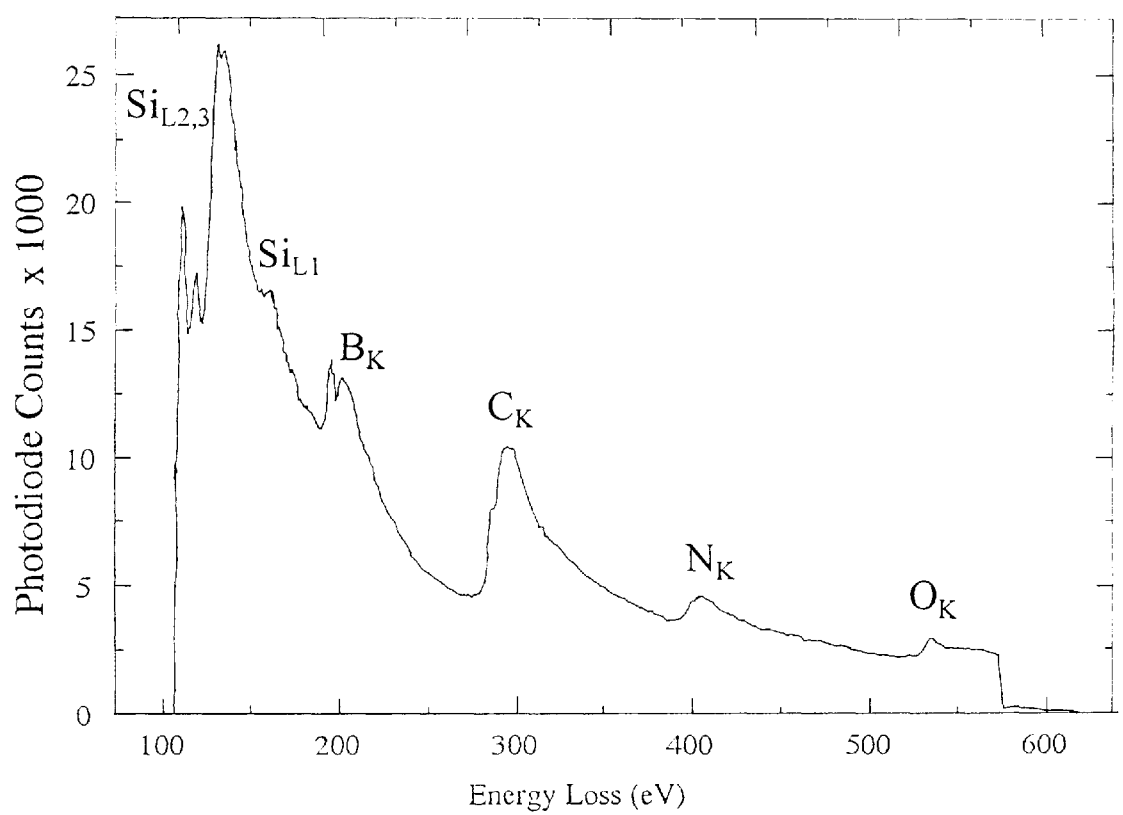
FIG. 2 shows a PEELS spectrum in connection with the material prepared in Example 2.
Figure 3:
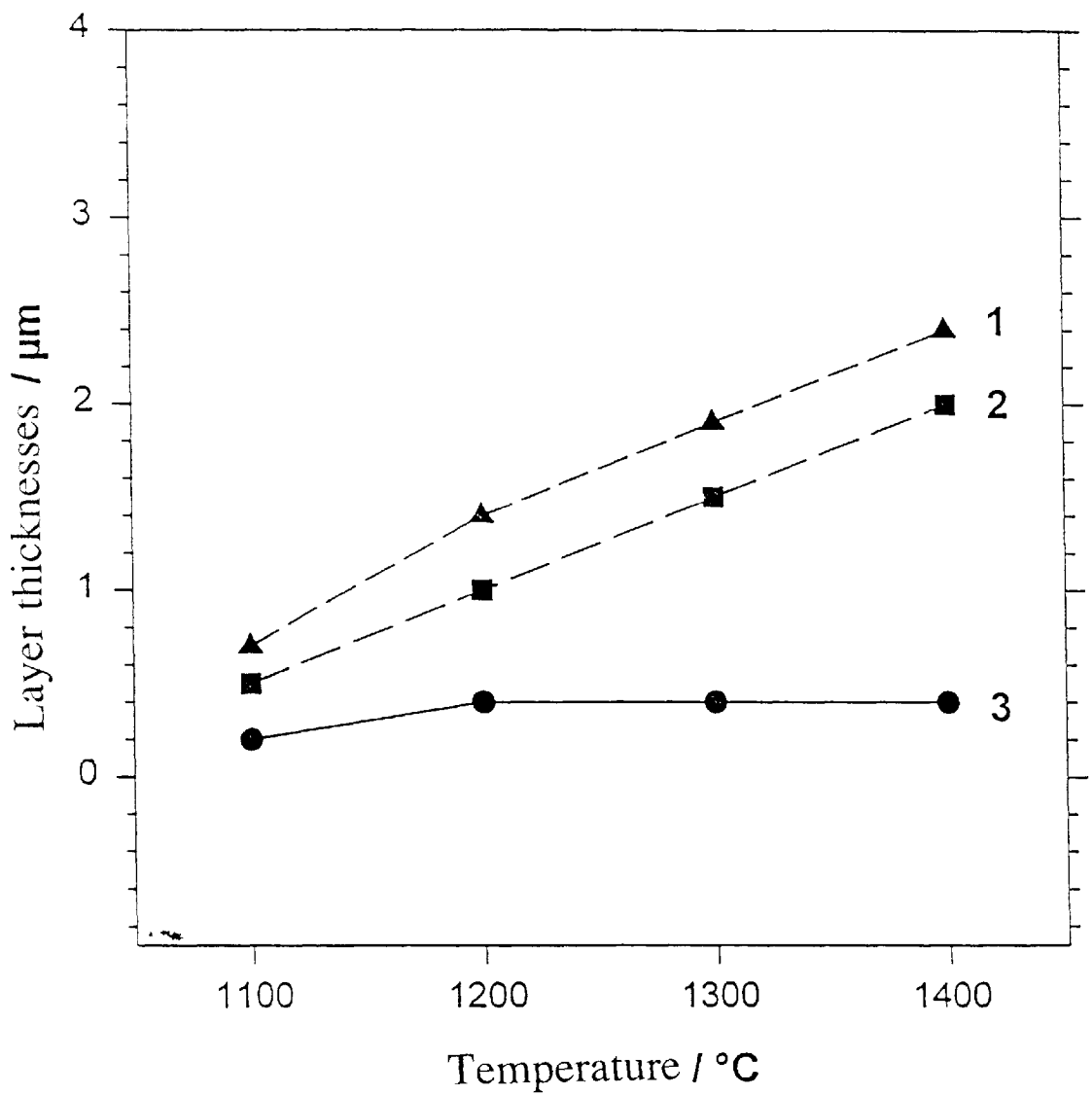
FIG. 3 is a graphical representation of layer thickness as a function of temperature for the material described in Example 2.

The fibres obtained as in a) and b2), which had an oxygen content of 4.9% by weight, were each oxidised for 24 hours in air between 1100 and 1400 C in 100 C steps. The atmosphere was replaced 480 times during the holding period. Fracture surfaces of the fibres were investigated by SEM. An oxidation layer could be detected on all the fibres by means of SEM in the material contrast mode and X-ray microanalysis. This oxidation layer was divided into a layer rich in B and N and a layer containing $SiO_2$. TEM investigations showed that in all cases the layer containing B and N comprised BN particles with a hexagonal and turbostratic crystal structure. FIG. 2 shows a typical PEELS spectrum (parallel detection electron energy loss spectroscopy) recorded for the B,N-containing layer between the BN particles. The spectrum shows the elements silicon, boron, nitrogen, oxygen and carbon, the carbon possibly originating partially or completely from the vapour deposition of carbon on the sample. The thicknesses of the oxidation layers and individual layers were determined from fracture surfaces using SEM. Whereas the amorphous fibre core and the $SiO_2$ layer have a smooth fracture surface, the fracture surface of the layer containing the BN crystals is rough. This morphological difference was used for the analysis. The thicknesses of the layers are shown in Table 1. FIG. 3 is a graphical representation of the layer thickness as a function of temperature, within the range from 1100 to 1400 C. It can be seen from FIG. 3 that the thickness of the oxidation layer (the sum of the layer containing BN crystallites and the layer containing $SiO_2$) and the thickness of layer 2 containing $SiO_2$ increases with increasing oxidation temperature, whilst the thickness of layer 3 containing BN crystals remains substantially constant over the temperature range from 1200 to 1400 C.

TABLE 1

| Oxidation temperature<br>Layer thickness | 1100 C. | 1200 C. | 1300 C. | 1400 C. |
|---|---|---|---|---|
| oxidation layer | 0.7 μm | 1.4 μm | 1.9 μm | 2.4 μm |
| layer containing $SiO_2$ | 0.5 μm | 1.0 μm | 1.5 μm | 2.0 μm |
| coating containing BN crystals | 0.2 μm | 0.4 μm | 0.4 μm | 0.4 μm |

Example 2

The fibres obtained as in a), b1) and c1), which had an oxygen content of 1.3% by weight, were oxidised for 24 hours and 100 hours in air at 1400 C. The heating rate was 20 C/min. The atmosphere was replaced 480 times and 2000 times, respectively, during the holding period. Fracture surfaces of the fibres were investigated by SEM. An oxidation layer was detected on all the fibres by means of SEM and X-ray microanalysis. This oxidation layer was composed of a layer rich in B and N and a layer containing $SiO_2$. TEM investigations showed that in all cases the layer containing B and N comprised BN particles with a hexagonal and turbostratic crystal structure, and PEELS spectra, recorded for the B,N-containing layer between the BN particles, revealed the elements silicon, boron, nitrogen, oxygen and carbon, the carbon possibly originating partially or completely from the vapour deposition of carbon on the sample. The thicknesses of the oxidation layers and individual layers are given in Table 2. The layer thicknesses were determined by SEM. The thickness of the layer containing BN crystals increases as the duration of oxidation increases. At the rapid heating rate selected (20 C/min), a constant $SiO_2$ layer thickness was formed in less than 24 hours. Fibres low in oxygen had thicker coatings containing BN crystals than did fibres rich in oxygen (see Example 1, 1400 C, 24 hours).

TABLE 2

| Duration of oxidation<br>Layer thickness | 24 hours | 100 hours |
|---|---|---|
| oxidation layer | 3.0 μm | 3.2 μm |
| layer containing $SiO_2$ | 2.0 μm | 2.0 μm |
| coating containing BN crystals | 1.0 μm | 1.2 μm |

Example 3

The fibres obtained as in a), b1) and c1), which had an increased oxygen content of 4.9% by weight due to an increased oxygen content of the polymer, were oxidised for 24 hours in air at 1400 C. The oxidised amorphous fibres containing Si, B, N and C were etched in an aqueous solution containing hydrofluoric acid at room temperature. After etching, no Si or O could be detected on the fibre surface by X-ray microanalysis. The fibre core containing Si, B, N and C and the coating, containing BN crystals, which contained BN particles with a hexagonal crystal structure, were not attacked.

Example 4

The fibres obtained as in a), b1) and c2), in which 5 g of hydrazine were used in step c2) instead of 5 g of borane dimethylamine complex, and which had an oxygen content of 1.3% by weight, were oxidised for 24 hours at 1100 C in oxygen. The fibres were then aged for 48 hours at 1650 C in $N_2$. The furnace atmosphere was replaced 2900 times. SEM investigations showed that the $SiO_2$ layer on the surface had volatilised during the after-treatment. B and N were detected, by X-ray microanalysis, as the major constituents on the fibre surfaces, together with Si and traces of O. Carbon was not found. A layer rich in B and N had been formed which also contained Si having at least one bond to oxygen, boron, nitrogen and/or carbon and which contained BN particles in the form of hexagonal crystals.

Example 5

The fibres obtained as in a), b1) and c2), which had an oxygen content of 1.5% by weight, were oxidised for 100 hours at 1500 C in air. The oxidation layer was investigated by TEM. BN crystallites with a diameter of about 20 to 70 nm were found in the layer which was rich in B and N. The smaller BN crystals were situated in the transition to the fibre core containing Si, B, N and C, and the larger BN crystals were situated in the transition to the layer containing $SiO_2$. A preferred alignment of the BN crystallites was not observed. A hexagonal structure was identified on the BN crystallites by electron diffraction. The crystallites exhibited pronounced lattice defects, which indicated a turbostratic configuration. An amorphous phase was situated between the BN crystallites. In this phase the elements silicon, boron, nitrogen, oxygen and carbon were detected by means of PEELS, the carbon possibly originating partially or completely from the vapour depostion of carbon on the sample. Bonding of the coating containing BN crystals to the fibre core containing Si, B, N and C and the layer containing $SiO_2$ occurred via continuous transitions. The fibres containing Si, B, N and C and the layer containing $SiO_2$ were amorphous. The thickness of the coating containing BN crystals was 1.25 μm and that of the layer containing $SiO_2$ was 2.6 to 2.7 μm.

Example 6

Figure 4:
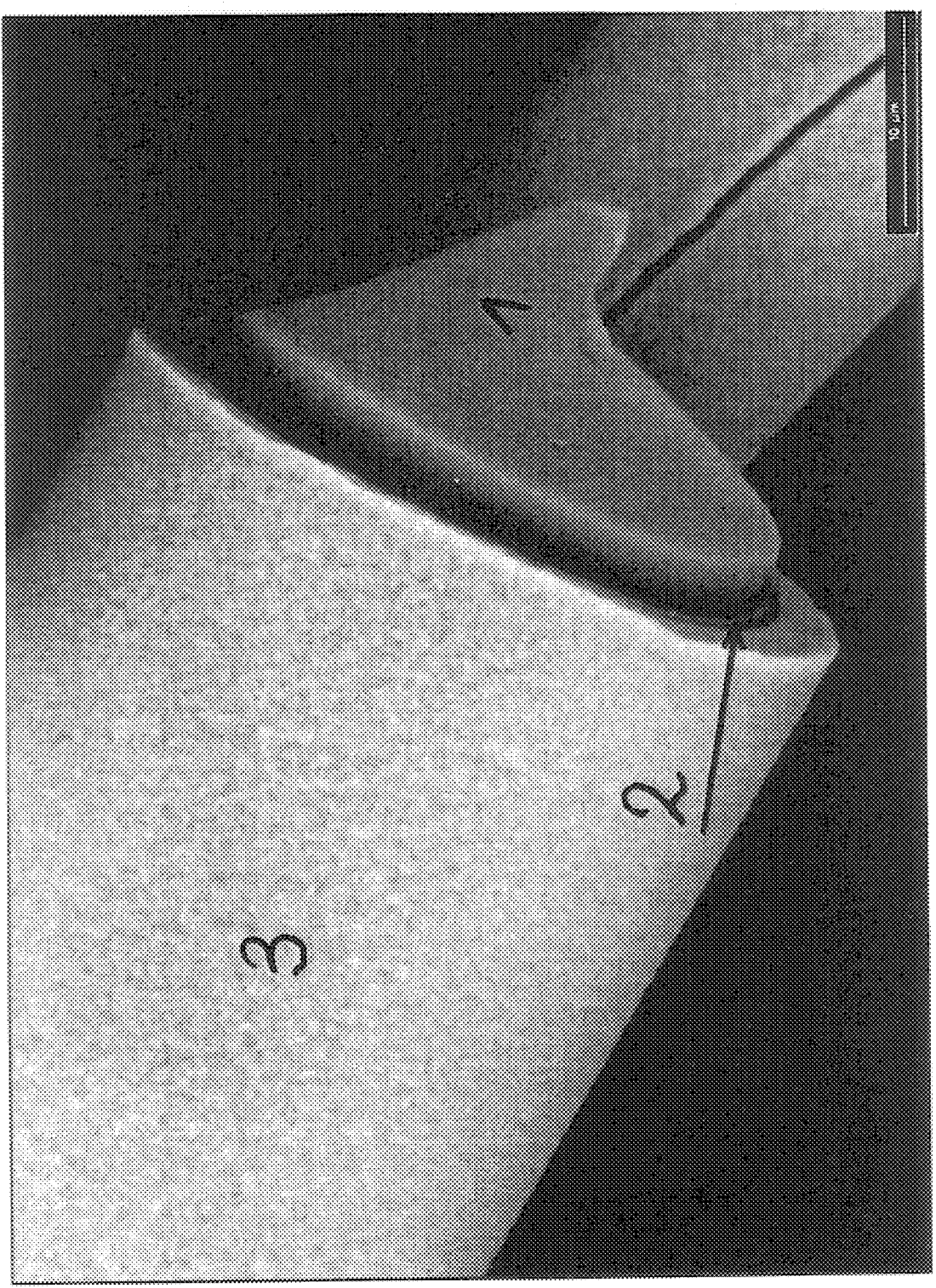
FIG. 4 shows scanning electron microscopy of the material prepared in Example 6.

The fibres obtained as in a) and b2), which had an oxygen content of 4.9% by weight due to an increased oxygen content of the polymer, were oxidised for 24 hours at 1100 C in air. The coated fibres were then additionally coated with about 3 μm of SiC by means of chemical vapour deposition (CVD). For this purpose, the fibre bundle was heated in Ar to 900 C and was then exposed for 8 hours at this temperature to methyltrichlorosilane vapour, which was converted into SiC on the fibres. Thereafter, the SiC-Clad fibres were annealed for 1 hour at 1200 C in argon. Bonding of the SiC matrix to the layer containing $SiO_2$ was good. The fibre composite material exhibited "fibre pull-out" on fracture, i.e. it exhibited the desired differences in strength between the fibre containing Si, B, N and C, the layer containing crystals and the matrix. SEM investigations showed that "debonding" occurred inside the coating containing BN crystals, at the transition to the fibre containing Si, B, N and C (FIG. 4). FIG. 4, which was taken with material contrast, shows a fibre core (1) containing Si, B, N and C which protrudes from the SiC cladding (3). The layer (2) containing $SiO_2$ is situated therebetween. The resolution of the SEM is not sufficient to resolve the coating containing BN crystals.

Example 7

The fibres obtained as in Example 1, which had not yet been oxidised (O content 4.9%), were oxidised for 24 hours at 1100 C in air, were embedded in an $Al/Al_2O_3/SiC$ powder mixture and a moulding was produced by isostatic pressing at 400 MPa. The moulding was converted into mullite by reaction sintering in air (1550 C, 1 hour). A polished section was prepared of this composite. The amorphous fibres containing Si, B, N and C were bonded into the mullite matrix. During reaction sintering, the layer which contained BN crystallites remained in existence on the fibre according to the invention. The overlying layer containing $SiO_2$ was not visible. The $SiO_2$ formed had reacted with Al or $Al_2O_3$ during the reaction sintering of the matrix, and had formed mullite. The amorphous fibre according to the invention did not crystallise out during the production of the matrix.

We claim:

1. Amorphous fibres containing Si, B and N, which are composed of a core, more than 80% by volume of which core consists of a three-dimensional glassy network which contains Si—N bonds as well as B—N bonds, and which optionally also contains Si—O, Si—C, B—C, C—C, C—N and/or B—O bonds, and further of at least one coating overlying the core which contains BN crystals having a hexagonal structure as well as Si having at least one bond to oxygen, boron, nitrogen and/or carbon.

2. Amorphous fibres containing Si, B and N according to claim 1, wherein the core comprises:
   $4 \leq x \leq 20\%$ by weight B,
   $5 \leq x \; 50\%$ by weight N,
   $10 \leq x \; 50\%$ by weight Si,
   $0 \leq x \leq 35\%$ by weight C, and
   $0 \leq x \leq 8\%$ by weight O.

3. Amorphous fibres containing Si, B and N according to claim 1, wherein the amount of BN crystals in the coating is 5% by volume $\leq x \leq 100\%$ by volume of crystalline BN.

4. Amorphous fibres containing Si, B and N according to claim 1, wherein the coating which contains BN crystals further contains amorphous BN and/or compounds of the elements silicon, carbon, boron, nitrogen and/or oxygen.

5. Amorphous fibres containing Si, B and N according to claim 1, further comprising an additional overlying layer consisting essentially of $SiO_2$ above the coating.

6. A process for producing amorphous fibres containing Si, B and N as claimed in claim 1, which comprises thermally oxidizing amorphous cured fibres containing Si, B and N, which consist of more than 80% by volume of a three-dimensional glassy network and which contain Si—N bonds as well as B—N bonds, and which optionally also contain Si—O, Si—C, B—C, C—C, C—N and/or B—O bonds.

7. A process according to claim 6, wherein the thermal oxidation is carried out over a period of 0.1 minutes $\leq t \leq 100$ hours at temperatures of $800° C. \leq T \leq 1700° C.$ at a pressure of 1 mbar $\leq p \leq 5$ bar.

8. A process according to claim 6, wherein thermal oxidation is followed by a thermal after-treatment in a non-oxidising atmosphere, carried out over a period of 5 minutes $\leq t \leq 140$ hours, at pressures between $10^{-5}$ and 2 bar and at temperatures of $800 \leq T \leq 1900° C.$, in $N_2$, CO and/or noble gases.

9. Composites having a matrix comprising metals, alloys, glasses and/or ceramics, wherein 30 to 70% by volume of the composites comprises the amorphous fibres of claim 1.

10. A process for producing composites according to claim 9, wherein at least one amorphous fibre, more than 80% by volume of which consists of a three-dimensional glassy network which contains Si—N bonds as well as B—N bonds, and which optionally also contains Si—O, Si—C, B—C, C—C, C—N and/or B—O bonds, is embedded in metals, alloys, glasses and/or ceramics and is thermally oxidised together with the matrix material over a period of 0.1 minutes $\leq t \leq 100$ hours at temperatures of $800° C. \leq T \leq 1700° C.$, at a pressure of 0.1 mbar $\leq p \leq 5$ bar, in air, oxygen, $CO_2$, gaseous $H_2O$ or nitrogen oxides.

* * * * *